United States Patent
Bloh et al.

(10) Patent No.: US 11,536,065 B2
(45) Date of Patent: Dec. 27, 2022

(54) HINGE ARRANGEMENT FOR A SWITCHGEAR CABINET HOUSING, AND CORRESPONDING SWITCHGEAR CABINET HOUSING

(71) Applicant: RITTAL GMBH & CO. KG, Herborn (DE)

(72) Inventors: Achim Bloh, Hohenahr-Ahrdt (DE); Nora Schöndorf, Eschenburg (DE); Wolfgang Reuter, Liebenscheid (DE)

(73) Assignee: RITTAL GMBH & CO. KG, Herborn (DE)

( * ) Notice: Subject to any disclaimer, the term of this patent is extended or adjusted under 35 U.S.C. 154(b) by 909 days.

(21) Appl. No.: 16/344,036

(22) PCT Filed: Nov. 6, 2017

(86) PCT No.: PCT/DE2017/100937
§ 371 (c)(1),
(2) Date: Apr. 23, 2019

(87) PCT Pub. No.: WO2018/099508
PCT Pub. Date: Jun. 7, 2018

(65) Prior Publication Data
US 2019/0257125 A1    Aug. 22, 2019

(30) Foreign Application Priority Data
Dec. 1, 2016 (DE) ...................... 10 2016 123 230.0

(51) Int. Cl.
*E05D 5/02*    (2006.01)
*E05D 3/12*    (2006.01)
(Continued)

(52) U.S. Cl.
CPC ............. *E05D 5/0238* (2013.01); *E05D 3/12* (2013.01); *E06B 7/16* (2013.01); *H02B 1/38* (2013.01);
(Continued)

(58) Field of Classification Search
CPC ..... E05D 5/0238; E05D 5/023; E05D 5/0223; E05D 5/0215; E05Y 2900/208; H02B 1/38
See application file for complete search history.

(56) References Cited

U.S. PATENT DOCUMENTS 4,827,568 A    5/1989    Ramsauer
4,873,745 A *   10/1989    Ramsauer ................ E05D 7/10
                                                                  16/259
(Continued)

FOREIGN PATENT DOCUMENTS

CN         1952337 A      4/2007
CN     103764931 A      4/2014
(Continued)

OTHER PUBLICATIONS

International Search Report (in English and German) and Written Opinion (in German) issued in PCT/DE2017/100937, dated Feb. 1, 2018; ISA/EP.

*Primary Examiner* — Jeffrey O'Brien
(74) *Attorney, Agent, or Firm* — Harness, Dickey & Pierce, P.L.C.

(57) ABSTRACT

The invention relates to a hinge arrangement for a switchgear housing cabinet, having a first hinge half, which is fastened to a vertical side wall, delimiting a door opening, of a switchgear cabinet housing, and having a second hinge half, which is fastened to a door element, the hinge halves being connected to each other such that they can pivot relative to each other via a rotation axis, so that the door element closes the door opening when in a closed position
(Continued)

and preferably completely exposes the door opening when in an open position, and the rotation axis being outside the outer periphery of both the door opening and the door element, wherein at least one of the hinge halves has a groove, via which the hinge half is fitted onto a protrusion on the outer periphery of the part of the switchgear cabinet housing and of the door element associated with the hinge half.

9 Claims, 12 Drawing Sheets (51) Int. Cl.
*E06B 7/16* (2006.01)
*H02B 1/38* (2006.01)
(52) U.S. Cl.
CPC ..... *E05Y 2900/20* (2013.01); *E05Y 2900/208* (2013.01)

(56) References Cited

U.S. PATENT DOCUMENTS

| | | | | |
|---|---|---|---|---|
| 5,232,277 | A * | 8/1993 | Cassady | H02B 1/38 16/221 |
| 5,259,091 | A * | 11/1993 | Mordick | H02B 1/38 16/382 |
| 6,118,071 | A * | 9/2000 | Munch | H02B 1/38 312/249.7 |
| 6,238,027 | B1 * | 5/2001 | Kohler | E05D 5/023 312/265.3 |
| 6,438,800 | B1 * | 8/2002 | Narang | H02B 1/38 16/229 |
| 6,721,994 | B2 * | 4/2004 | Bowman | E05D 11/00 16/382 |
| 7,533,443 | B2 * | 5/2009 | Benner | E05F 5/04 16/82 |
| 10,017,973 | B2 * | 7/2018 | Höschler | E05D 7/1061 |
| 10,544,611 | B2 * | 1/2020 | Nicholas, Iii et al. | . E05D 5/128 |
| 2007/0101650 | A1 | 5/2007 | Benner | |
| 2016/0352080 | A1 | 12/2016 | Brueck et al. | |
| 2016/0352082 | A1 | 12/2016 | Boehme et al. | |
| 2016/0352083 | A1 | 12/2016 | Brueck et al. | |
| 2018/0375302 | A1 | 12/2018 | Reuter et al. | |
| 2022/0106819 | A1 * | 4/2022 | Zeitler | E05D 3/02 |

FOREIGN PATENT DOCUMENTS

| | | |
|---|---|---|
| CN | 204597321 U | 8/2015 |
| DE | 3340491 C1 | 5/1985 |
| DE | 29517780 U1 | 3/1997 |
| DE | 102014101404 A1 | 8/2015 |
| EP | 022387 A1 | 1/1981 |
| EP | 0192520 A1 | 8/1986 |
| EP | 0223871 A1 | 6/1987 |
| EP | 0274552 A1 | 7/1988 |
| EP | 1777363 B1 | 11/2011 |
| GB | 02149843 A | 6/1985 |
| JP | H11332031 A | 11/1999 |

* cited by examiner

HINGE ARRANGEMENT FOR A SWITCHGEAR CABINET HOUSING, AND CORRESPONDING SWITCHGEAR CABINET HOUSING

CROSS-REFERENCE TO RELATED APPLICATIONS

This application is a 371 U.S. National Stage of International Application No. PCT/DE2017/100937, filed on Nov. 6, 2017, which claims priority to German Application No. 10 2016 123 230.0, filed Dec. 1, 2016. The entire disclosures of the above applications are incorporated herein by reference

BACKGROUND

This section provides background information related to the present disclosure which is not necessarily prior art.

TECHNICAL FIELD

The invention is directed to a hinge arrangement for a switchgear cabinet housing, having a first hinge half which is fastened to a vertical side wall, delimiting a door opening, of a switchgear cabinet housing, or to a vertical profile of a framework, delimiting a door opening, of a switchgear cabinet housing, and having a second hinge half, which is fastened to a door element, the hinge halves being connected to each other so as to be able to pivot relative to each other via a rotation axis, so that the door element closes the door opening when in a closed position and preferably completely exposes the door opening when in an open position, and the rotation axis being situated outside an outer circumference of both the door opening and the door element. Such a hinge arrangement is known from EP 1 777 363 B1.

DISCUSSION

By relocating the rotation axis to outside the outer circumference of both the switchgear cabinet housing as well as the door element, a so-called 180° hinge is obtained, which makes it possible to pivot the door element by at least 180° from its closed position into an open position. The previously known hinge arrangements have the disadvantage that in order to mount them, either the switchgear cabinet housing or the door element must be reworked. Special cutouts for implementing the rotation axes or holes for fastening the hinge halves, for example, must be provided, without which it is not possible to mount the known hinge arrangement on the switchgear cabinet housing or on the door element.

SUMMARY

This section provides a general summary of the disclosure, and is not a comprehensive disclosure of its full scope or all of its features.

It is therefore the aspect of the invention to propose a generic hinge arrangement, which requires no reworking of the switchgear cabinet housing or of the door element, and thus enables the essentially tool-free mounting of the hinge arrangement.

Accordingly, it is provided that in a hinge arrangement of the type described at the outset, at least one hinge half has a groove, via which the relevant hinge half is fitted onto a projection on the outer circumference of the part of the switchgear cabinet housing and of the door element associated with the hinge half. For this purpose, a clip-connection, for example, may be formed between the projection and the groove so that the hinge half may be mounted by being "clipped on" to the switchgear cabinet housing or to the door element.

By fitting the hinge halves onto the projection via the groove, it is possible to at least pre-mount the hinge halves on the component that includes the projection, i.e. either on the switchgear cabinet housing or on the door element. The pre-mounting may take place, for example, in that fastening means, for the force-fitting connection of switchgear cabinet housing or door element and hinge halves are pre-positioned for a subsequent force-fitting connection. For this purpose, fastening mounts, for example, fastening passages or holes of hinge halves and switchgear cabinet housing or door element may, for example, be aligned relative to one another, so that only one fastening means, for example, a locking pin, may be inserted without the use of tools for the final, force-fitting interlocking of both components.

The projection may extend parallel to the rotation axis and, at least when the door element closes the door opening, perpendicular to the plane of the door opening, thus, may project out from the plane of the door opening. The projection may, in particular, be an optionally circumferentially closed, 90° folded edge on the outer circumference of the door element. The projection may also be a protruding web or a circumferential flange.

It may further be provided that the projection includes a fastening means on its inner side facing away from the outer circumference, and the hinge halves fitted completely onto the projection via their groove include an additional fastening means operatively coupled to the fastening means, via which the second hinge half is fixed in its position fitted completely onto the projection.

The fastening means in this configuration may be a pin through-opening, in particular, a welded eyelet and the additional fastening means may be an additional pin through-opening through the second hinge half, which is aligned with the pin through-opening, the aligned pin through-openings being connected to one another via a connecting pin passed through them.

The door element may be an edged flat part, which includes a door side that extends parallel to, and covers, the door opening when the door element is in the closed position, and which includes the peripheral 90° folded edge, and wherein the second hinge half is mounted or is in abutment with a first support surface on the door side and with a second support surface on the 90° folded edge.

The switchgear cabinet housing may also have a U-profile on the door opening having two parallel or essentially parallel profile sides, which is connected to an additional profile side extending perpendicularly relative to the two profile sides, wherein the U-profile is contoured to the additional side wall via a first of the essentially parallel profile sides and an additional 90° folded edge, and wherein the second of the parallel profile sides is a sealing side abutting a sealing element situated on the inner side of a door element, when the door element is in its closed position.

The first hinge element in this case may extend between the two parallel profile sides and may be fastened to the profile side contoured on the side wall.

The second hinge half may also include two bearing parts, each having a first through-hole for accommodating the rotation axis, a second through-hole extending parallel to the first through-hole for accommodating the fastening means and a partial groove extending continuously in the direction of the rotation axis, also parallel to the first through-hole, wherein the two bearing parts are connected to one another via a connecting web at a distance to one another and to both aligned first and second through-holes as well as aligned partial grooves.

In this configuration, it may further be provided that the connecting web has a contact side, which aligns in each case with a boundary side of the two partial grooves, so that the contact side of the connecting web, together with the boundary sides of the partial grooves, forms a groove boundary wall of the groove of the second hinge half, which is continuous in the direction of the rotation axis. The two boundary sides of the two partial grooves may be, in particular, one of the two lateral, i.e. extending in the depth direction of the groove, side walls of the partial grooves spaced opposite and essentially parallel to one another.

The groove of the second hinge half may be interrupted on its side opposite the continuous groove boundary wall in the area between the two bearing parts.

The second hinge half may also include two bearing parts, each having a first through-hole for accommodating the connecting pin and a hinge pin sleeve extending parallel to the through-openings for accommodating the hinge pin, wherein the two bearing parts are connected via a connecting web at a distance to one another with aligned first through-holes and with the hinge pin sleeve, and wherein the groove is formed between the bearing parts and the connecting web.

The groove may have an L-shaped design, including a first groove section between the connecting web and a respective, first contact side of the bearing parts, and including a second groove section between the hinge pin sleeve and a respective second contact side of the bearing parts.

The first and the second contact side, for each bearing part, may be oriented perpendicular to one another and may merge into one another via a first round section.

The connecting web may extend perpendicularly to an additional contact side of the hinge pin sleeve, wherein the additional contact side is situated parallel spaced apart relative to the second contact sides, thereby forming the second groove section, wherein the connecting web merges into the additional contact side via a second round section, and wherein the radius of the first round section is greater than the radius of the second round section.

The hinge arrangement may also have a vertical profile of the framework of a switchgear cabinet housing, in particular, in the case of large cabinets that have a framework, wherein the cross section of the vertical profile includes two sealing webs oriented perpendicularly to one another, which are connected to one another via a connecting profile side recessed relative to sealing edges of the two sealing webs, wherein the first hinge half is fixed to the vertical profile via the connecting profile side.

The first hinge half may be fixed via a fastening flange to the connecting profile side, to which an L-shaped profile section is molded at a 45° angle to a first profile web, wherein the first profile web merges into a second profile web via a 90° transition, at the free end of which a hinge pin sleeve is situated in the rotation axis.

According to another aspect of the invention, a switchgear cabinet housing is described, which includes a side wall or a vertical profile, on which a door element is fastened via at least one hinge arrangement according to one of the preceding claims.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Additional details of the invention are explained with reference to the figures below, in which.

DETAILED DESCRIPTION

Example embodiments will now be described more fully with reference to the accompanying drawings.

Figure 1:
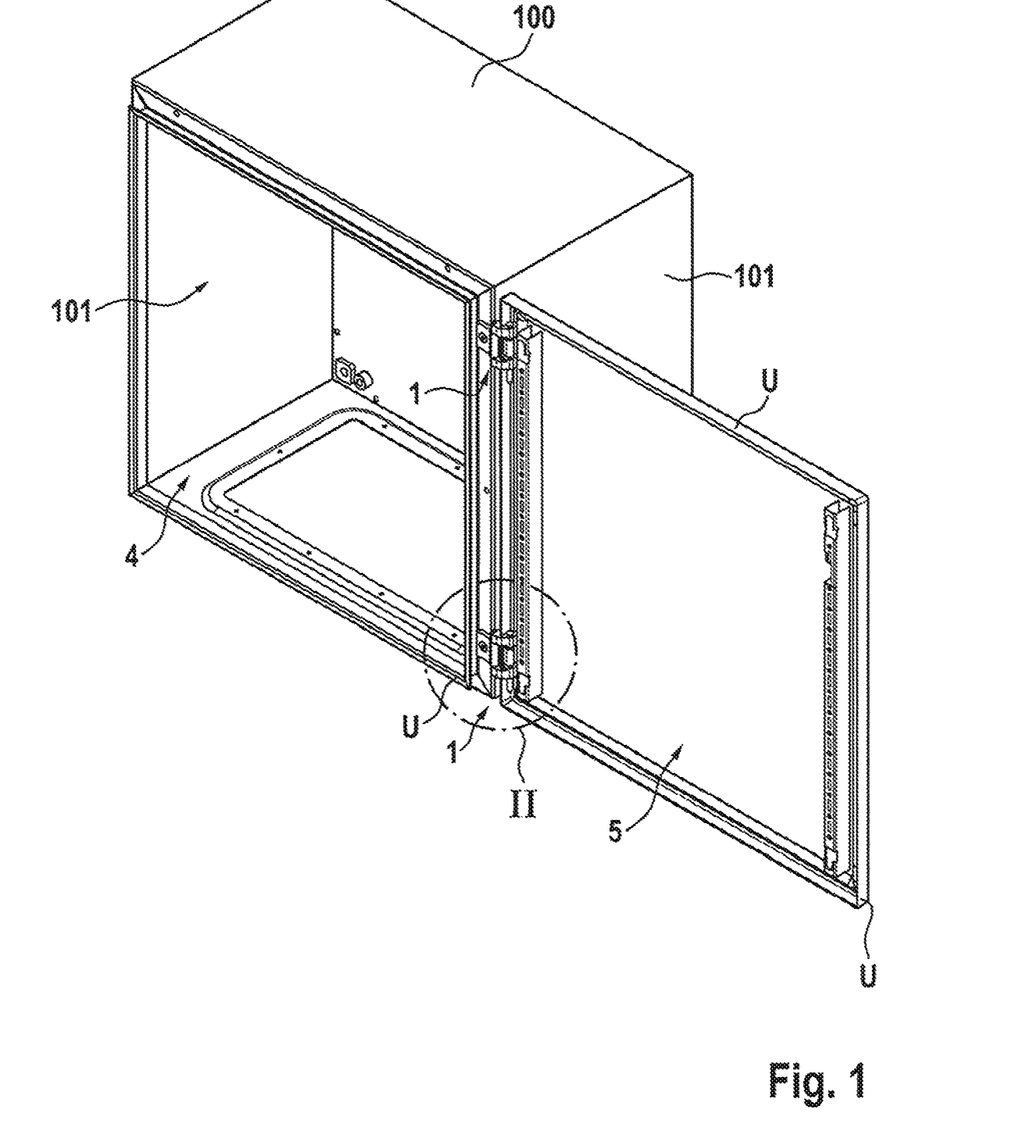
FIG. 1 shows a perspective view of an exemplary switchgear cabinet housing, in which the door element is situated in a set position opened by 180°.

FIG. 1 shows an exemplary switchgear cabinet housing 100, in which the door element 5 is situated in an open position pivoted by 180° relative to the close position. The door element 5 is rotatably fastened to the switchgear cabinet housing 100 via two hinge arrangements 1, which connect the outer circumferences U of door element 5 and switchgear cabinet housing 100 to one another.

Figure 2:
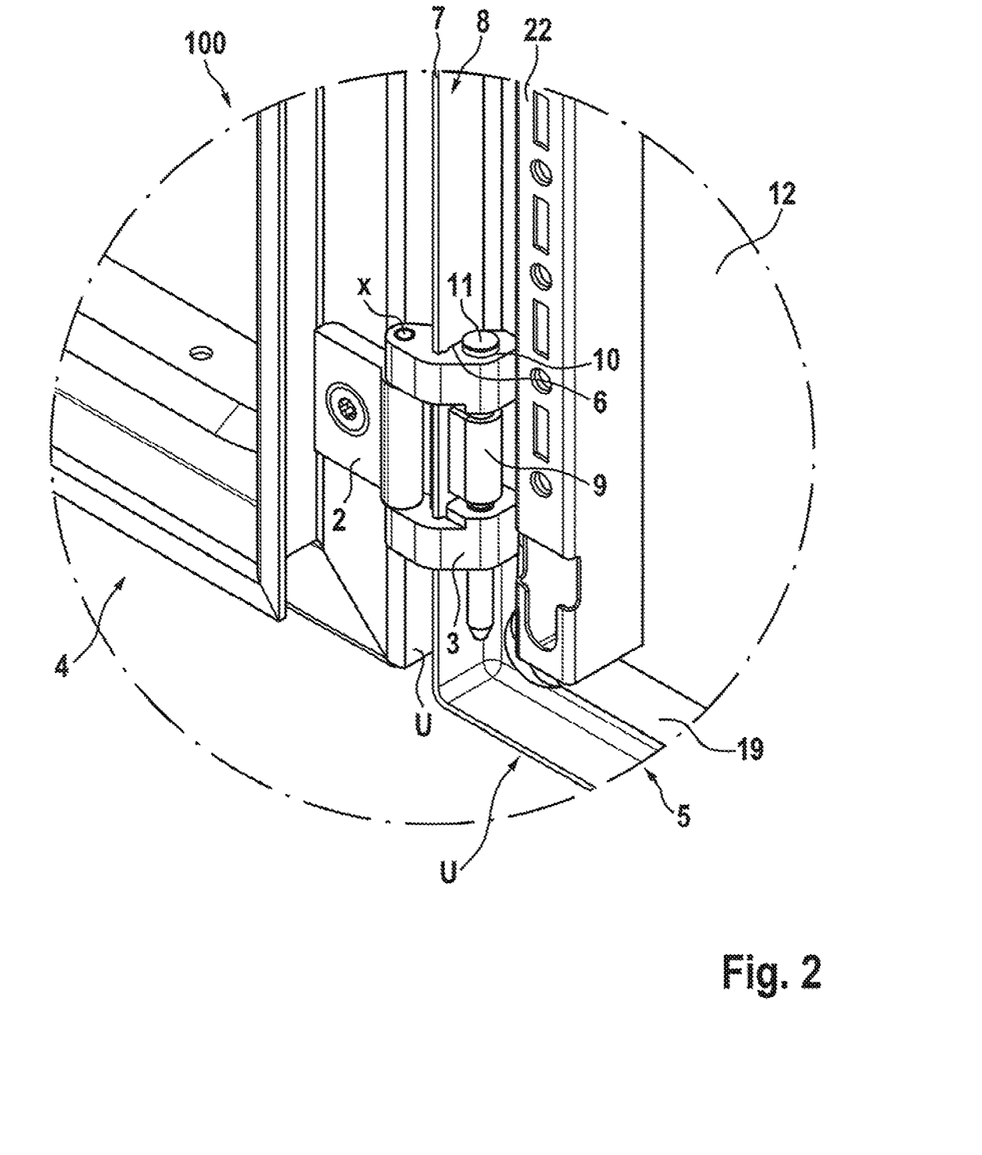
FIG. 2 shows a detail view of the hinge arrangement of the switchgear cabinet housing according to FIG. 1.

The lower hinge arrangement 1 in the representation according to FIG. 1 is shown in detail in FIG. 2. Accordingly, the hinge arrangement 1 includes a first hinge half 2, which is fixed on the outer circumference U of the switchgear cabinet housing 100 via a pin. A second hinge half 3 is clipped onto the outer circumference U of the door element 5 via a projection 7 and locked on the door element via a connecting pin 11. The connecting pin 11 is passed through fastening means 10 designed as through-holes through the second hinge half 3, and through a fastening means 9 on the door side, which is an eyelet welded on the outer circumference U of the door element 5.

A tubular door frame 22 is situated on the inner door side 12 of the door element 5. The rotation axis x is formed by a rotating pin or hinge pin, which pivotally connects the two hinge halves 2, 3 to one another.

Figure 3:
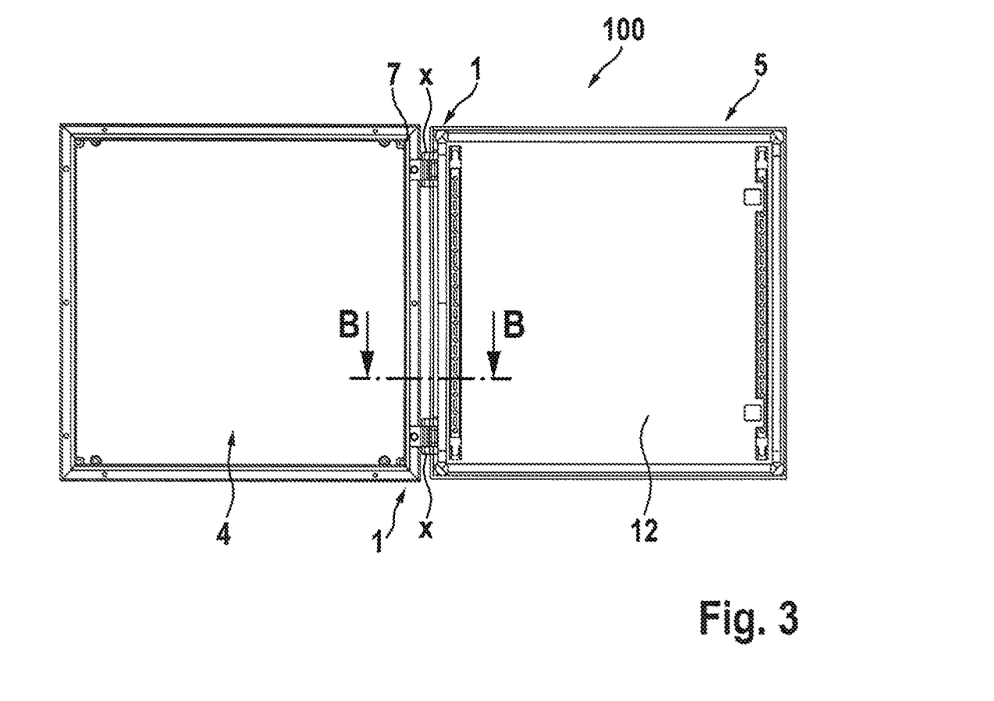
FIG. 3 shows a top view of the door side of the switchgear cabinet housing according to FIG. 1 with opened door.
Figure 4:
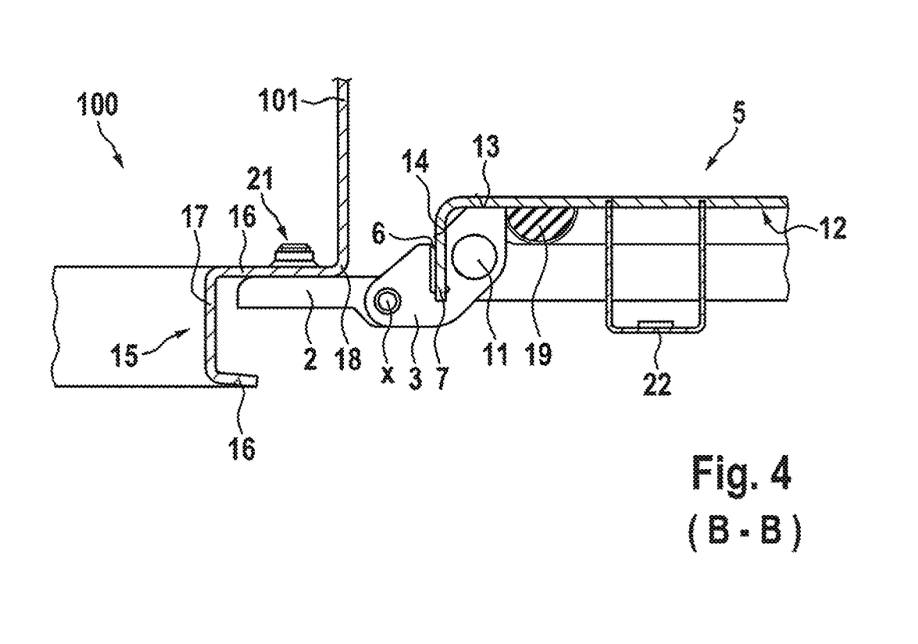
FIG. 4 shows a cross-sectional view along the section B-B plotted in FIG. 3.
Figure 5:
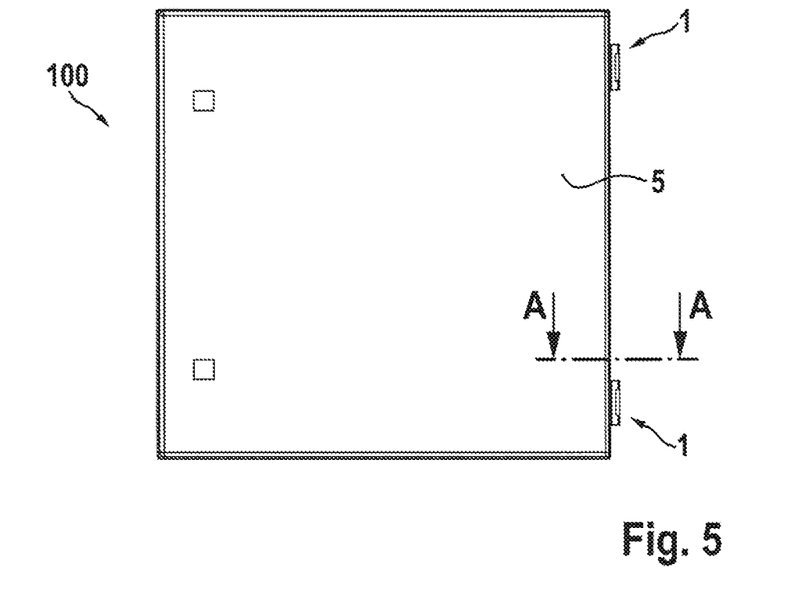
FIG. 5 shows a plan view of the door side of a switchgear cabinet housing with closed door element.

The structure of the hinge arrangement 1 shown in the preceding figures is explained further in FIGS. 3 and 4. In the open position of the door element 5 shown in FIGS. 3 and 4, it is apparent that the switchgear cabinet housing 100 has a U-profile 15 contoured on its side wall 101, having two essentially parallel profile sides 16, which are connected to one another at a distance via an additional profile side 17 perpendicular to the parallel profile sides. The first hinge half 2 protrudes into an accommodation space formed between the essentially parallel profile sides 16 and is fixedly screwed via a screw connection to the profile side 16 transitioning into the side wall 101 via a 90° folded edge. The opposite, free profile side 16 forms a sealing plane, which comes into contact with the sealing element 19 in the closed position (cf. FIG. 6), and thus seals the interior space of the switchgear cabinet housing 100 from the environment when the door element 5 is in the closed position. The projection 7 is designed as a circumferentially closed 90° folded edge on the outer circumference U of the door element 5. The door element 5 is, in particular, an edged flat part, which includes a door side extending in the closed position (cf. FIG. 6) of the door element 5 parallel to, and covering, the door opening 4, and which includes the circumferential 90° folded edge. The second hinge half 3 is mounted with a first support surface 13 on the door side 12 and with a second support surface 14 on the 90° folded edge.

Figure 6:
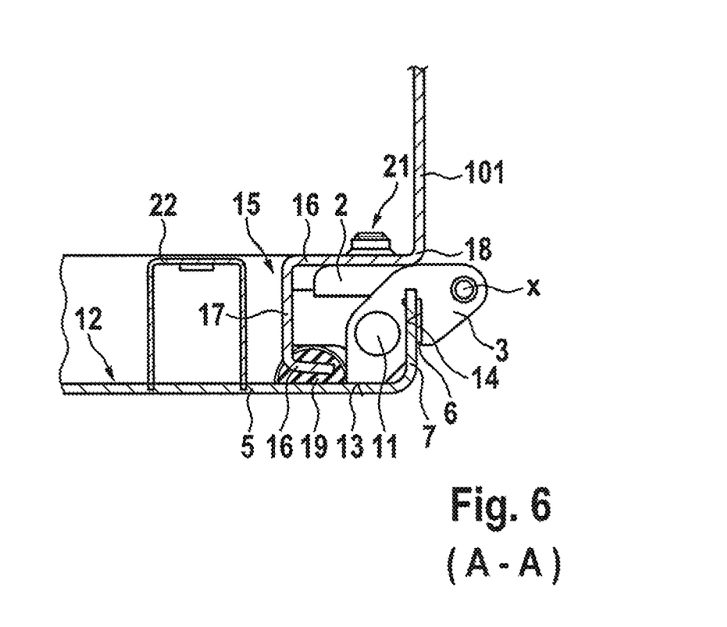
FIG. 6 shows a cross-sectional view along the section A-A plotted in FIG. 5.

In FIG. 6, it is apparent how the sealing side 16 intrudes into the sealing element in the closed position, i.e., compresses the sealing element in order to thus produce a sealing connection between the switchgear cabinet housing and the door element.

Figure 7:
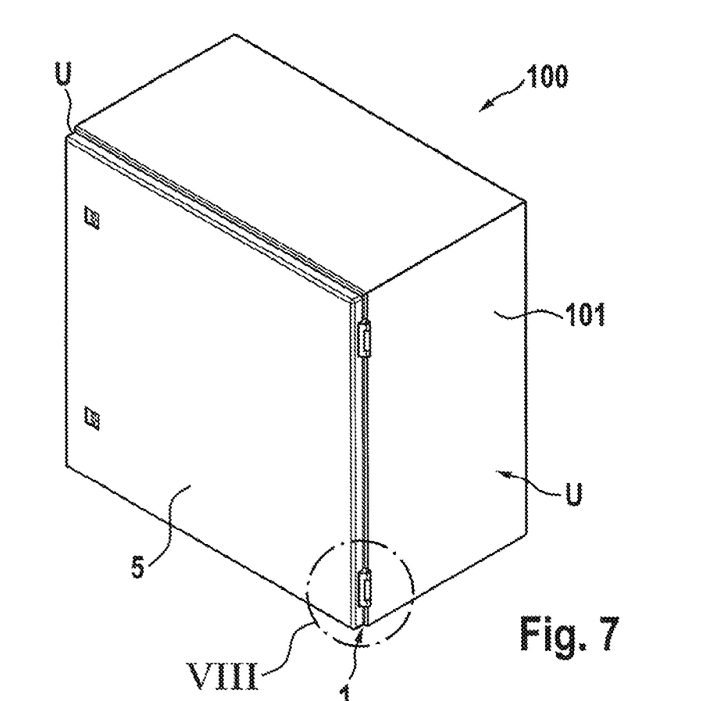
FIG. 7 shows a perspective view of a switchgear cabinet housing with closed door element.
Figure 8:
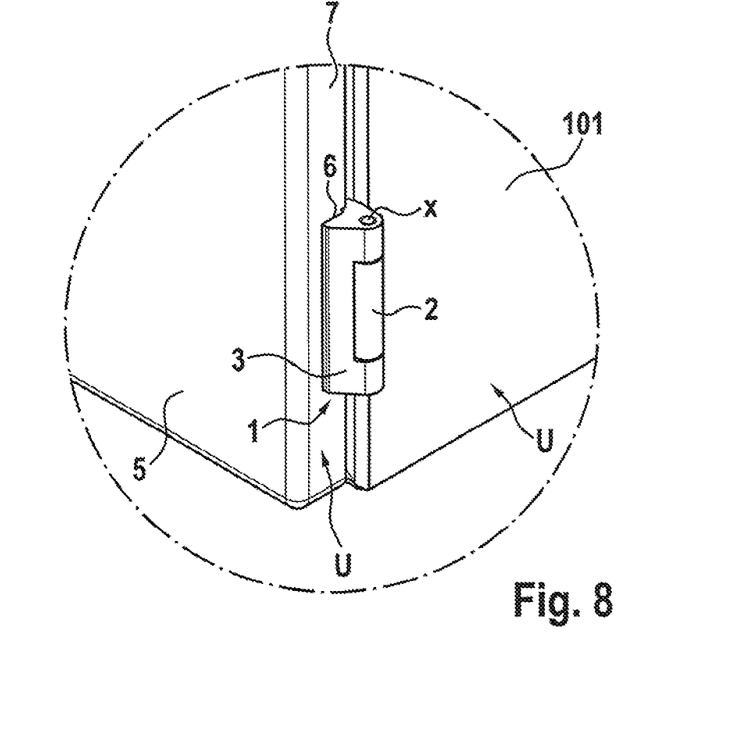
FIG. 8 shows a detail view of the switchgear cabinet housing according to FIG. 7 in the area of the hinge arrangement in a perspective representation.

FIGS. 7 and 8 illustrate that the rotation axis x of the hinge arrangement 1 is situated outside of both the outer circumference U of the switchgear cabinet housing 100 as well as the door element 5, thereby enabling the 180° pivotability of the door element 5 relative to the housing 100.

Figure 9:
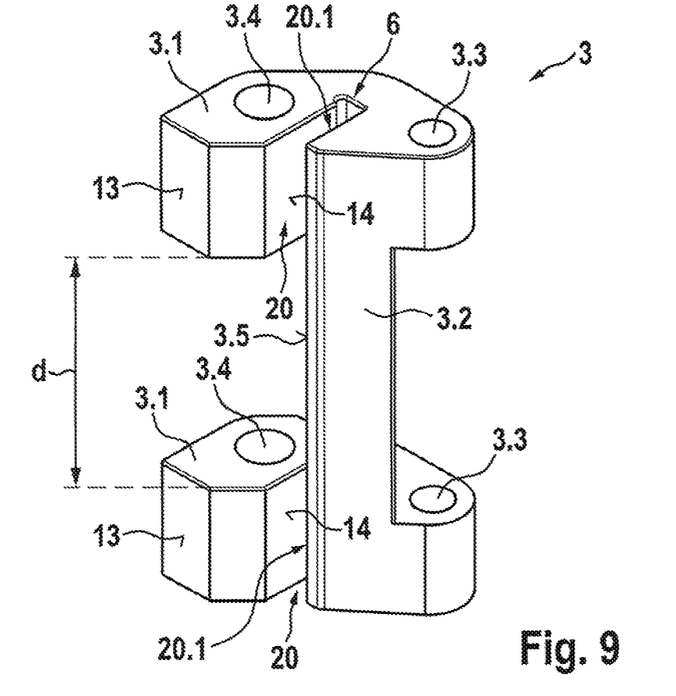
FIG. 9 shows an exemplary embodiment of a second hinge half.
Figure 10:
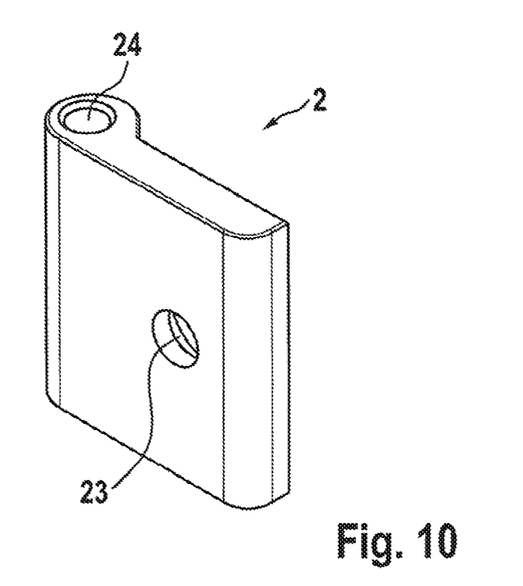
FIG. 10 shows an exemplary embodiment of a first hinge half.
Figure 11A:
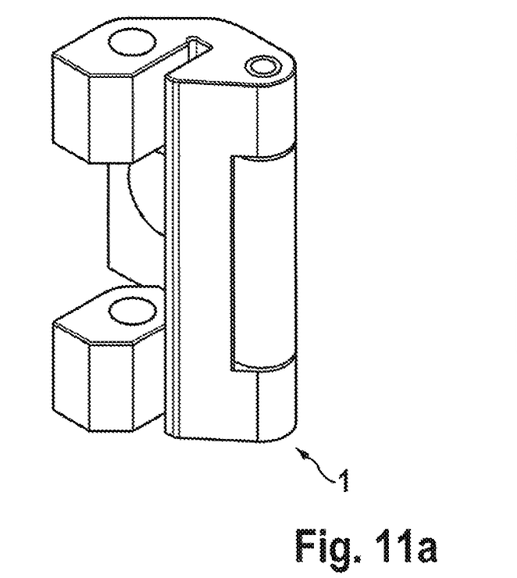
FIGS. 11a-11d show various perspective views of a hinge arrangement, composed of the hinge halves shown in FIGS. 9 and 10.
Figure 11B:
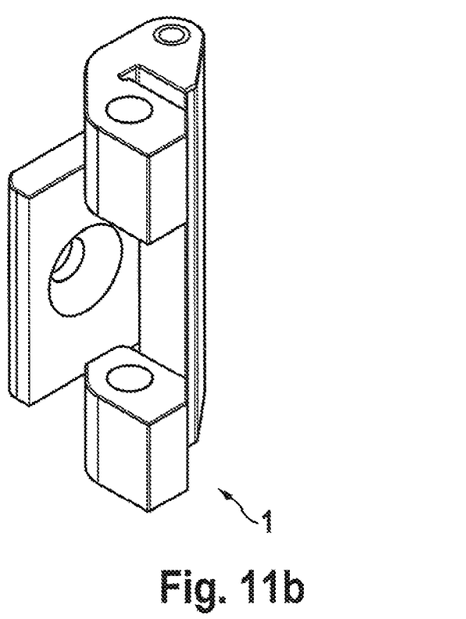
Figure 11C:
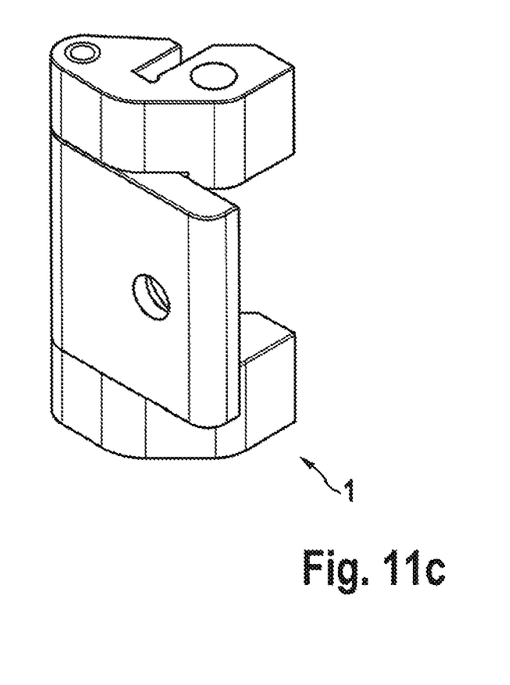
Figure 11D:
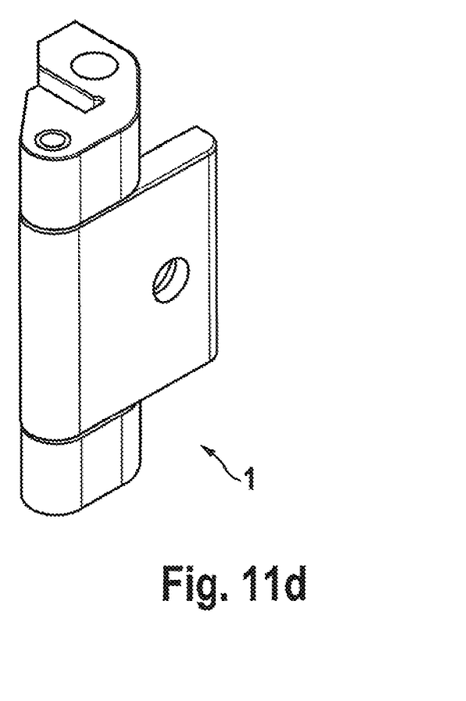

An exemplary embodiment of the first and of the second hinge half is shown in FIGS. 9 and 10. The second hinge half 3 according to FIG. 9 includes two bearing parts 3.1 spaced apart from one another by a distance d, each including a first through-hole 3.3 for accommodating the rotation axis x and a second through-hole 3.4 extending parallel thereto for accommodating the connecting pin 11. The bearing parts 3.1 further include partial grooves 20 also extending parallel to the first and second through-holes 3.3, 3.4. The two bearing parts 3.1 are connected to one another via a connecting web 3.2 by a distance d relative to one another and to both aligned first and second through-holes 3.3 as well as aligned partial grooves 20.

It is further apparent that the connecting web 3.2 has a contact surface 3.5, which aligns with one boundary side 20.1 each of the two partial grooves 20, so that the contact side 3.5 of the connecting web 3.2, together with the boundary sides 20.1 of the partial grooves 20, forms a groove boundary wall of the groove 6 of the second hinge half 3, which is planar in the rotation direction and continuously single-piece. Furthermore, the groove 6 of the second hinge half 3 is interrupted on its side opposite the continuously single-piece groove boundary wall in the area between the two bearing parts 3.1.

The first hinge half 2 shown in FIG. 10 may include a rotation axis opening 24 corresponding to the through-holes 3.3. The first hinge half 2 may therefore be essentially form-fittingly accommodated between the two through-holes 3.3 of the second hinge half 3 in such a way that the through-opening 3.3 and the rotation axis 24 are aligned, so that a rotation axis, for example, in the form of a metal pin, may be guided through the aligned openings 3.3, 24 and thus, the hinge halves 2, 3 may be pivotally connected to one another.

The hinge halves 2, 3 connected to one another in this manner form a hinge arrangement 1, as it is depicted in various perspective views in FIGS. 11a-11d.

Figure 12:
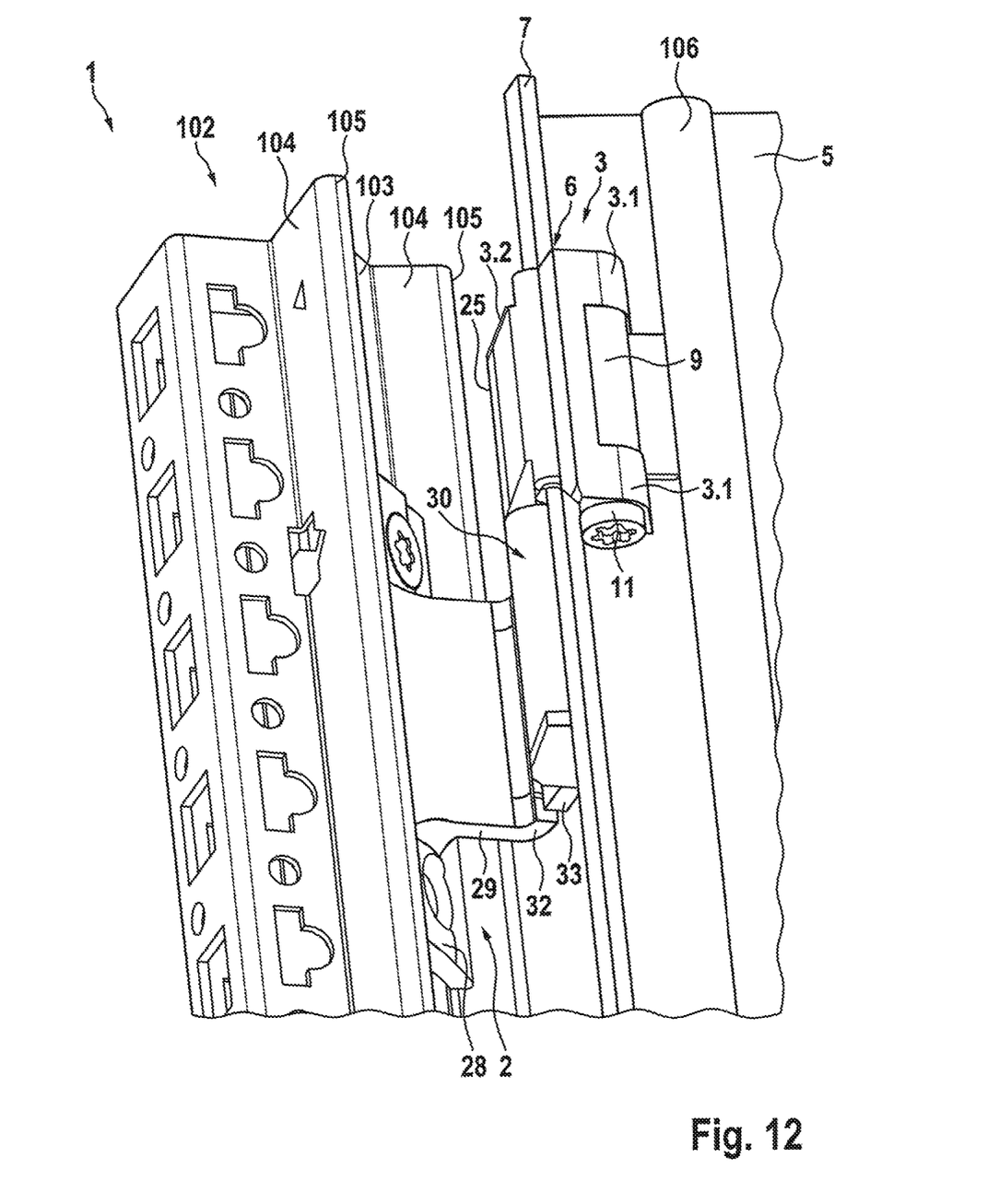
FIG. 12 shows another embodiment of a hinge arrangement in the open position and in a perspective representation.

FIG. 12 shows a hinge arrangement 1, in which a door element 5 is fixed for pivotable movement on a vertical profile 102 of a switchgear cabinet housing via a hinge formed from a first hinge half 2 and a second hinge half 3. The vertical profile 102 may be a part of a framework of a switchgear cabinet housing. The vertical profile 102 may have a cross-sectional geometry as it is known from DE 10 2014 101 404 A1.

The vertical profile 102 includes two sealing webs 104 oriented essentially perpendicular to one another, which form sealing planes via their free sealing edges 105 in two planes situated perpendicularly to one another, along which the sealing webs 104 may be brought into contact with a sealing element 106 in a sealing manner. The door element 5 in the representation according to FIG. 8 includes a sealing element 106 on its inner side which, in the closed position of the hinge arrangement, comes into contact with the sealing edge 105 of the front sealing web 104 in the representation.

The sealing webs 104, recessed relative to the free sealing edges 105, are connected to one another via a connecting profile side 103. The connecting profile side 103 extends essentially at an angle of 45° to the two sealing webs 104. The first hinge half 2 is fixed to the connecting profile side 103 via a fastening flange 28. Molded to the fastening flange 28 is an L-shaped extension, consisting of a first profile web 29, which extends at an angle of 45° to the fastening flange 28 and of a second profile web 33 extending at an angle of 90° to said fastening flange. The first profile web 29 and the second profile web 33 are connected to one another via a 90° transition. A hinge pin seat 30, in which a hinge pin may be accommodated, for example, press-fitted, is molded onto the end of the second profile web 33 facing away from the fastening flange 28, wherein a free end of the hinge pin protrudes from the upper end of the hinge pin seat 30 in the representation according to FIG. 12, and extends into a hinge pin sleeve 25 of the second hinge half 3, so that the two hinge halves 2, 3 are fixed to one another so as to be able to pivot relative to one another.

The inner side of the door element 5 includes a fastening means 9, which may be designed in the form of a welded sheet metal tab and via which the second hinge half 3 is fixed via its two bearing parts 3.1 with the aid of a connecting pin 11. The second hinge half 3, in turn, includes a groove 6, via which it is fitted onto a projection 7 on the outer circumference of the door element 5. The projection 7 in this case is designed as an outer 90° folded edge of the door element 5, wherein the projection 7 projects outward on the inner side of the door element 5.

Figure 13:
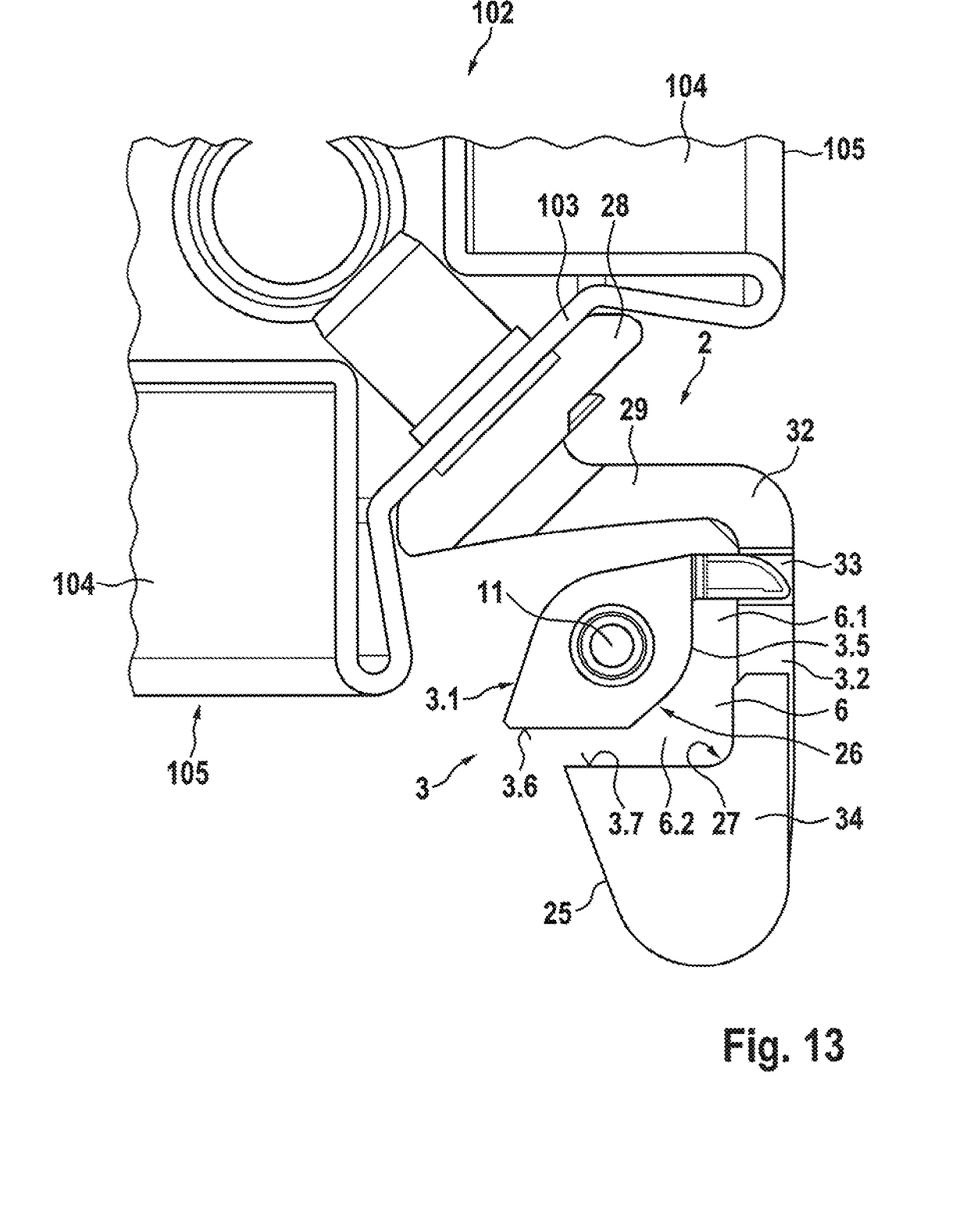
FIG. 13 shows the hinge arrangement according to FIG. 12 in a top view and with door element removed.
Figure 14:
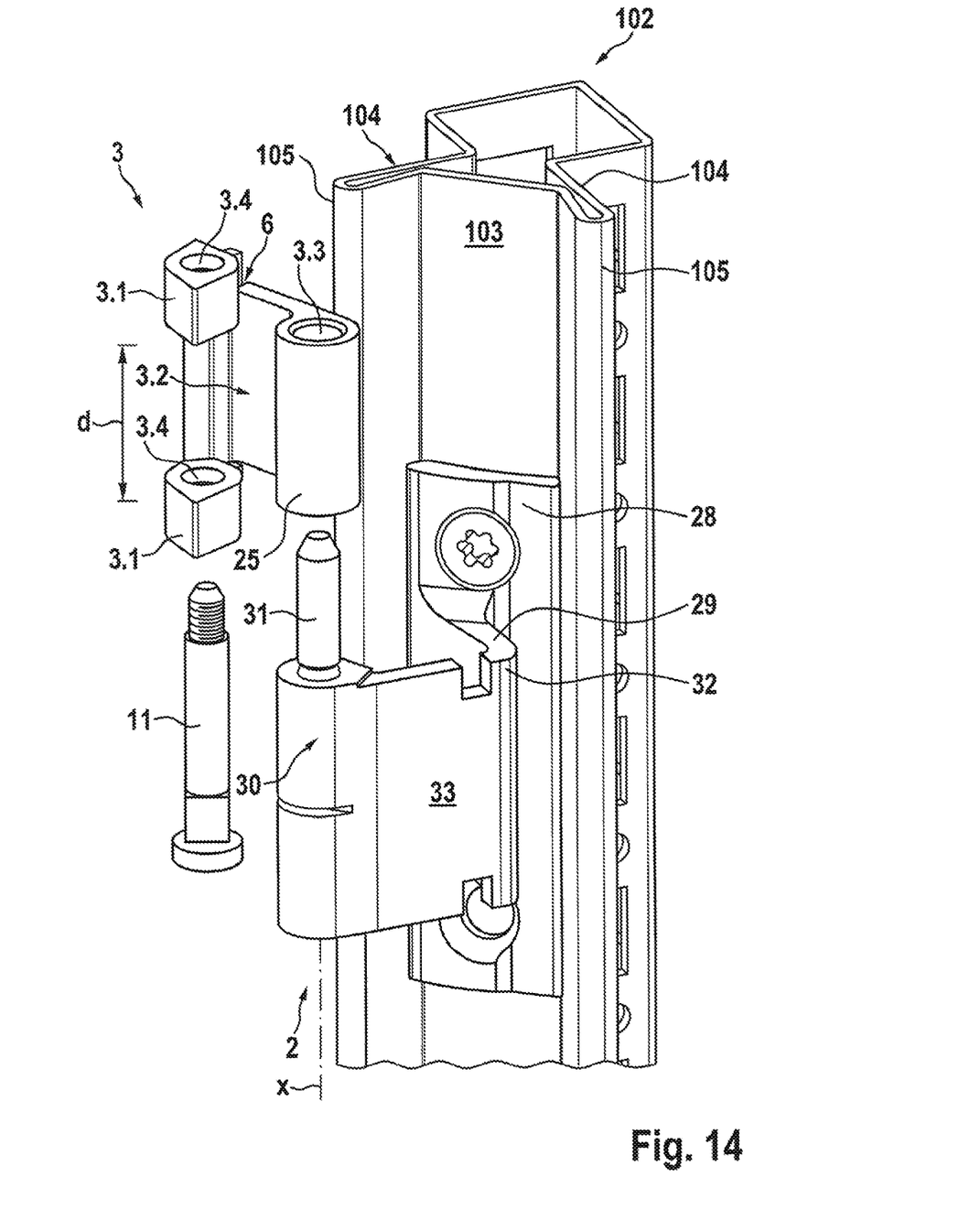
FIG. 14 shows the hinge arrangement according to FIG. 9 in an exploded representation.

FIGS. 13 and 14, when viewed together, depict additional details of the embodiment of a hinge arrangement shown in FIG. 12, wherein the door element 5 has been removed for better illustration. Accordingly, the second hinge half 3 includes two bearing parts 3.1, each having a first through-hole 3.3 for accommodating a connecting pin 11. At least one of the through-holes 3.3 may be designed as a threaded hole if, as is depicted in FIG. 10, the insertion end of the connecting pin 11 includes an outer thread, for example. The second hinge half 3 also includes a hinge pin sleeve 25 extending parallel to the through-holes 3.3 for accommodating the rotation axis x. The rotation axis x is formed by a hinge pin 31, which is press-fittingly accommodated in a hinge pin seat 30 of the first hinge half 2.

The two bearing parts 3.1 are connected via a connecting web 3.2 at a distance d to one another to aligned through-holes 3.3 and to the hinge pin sleeve 25. The groove 6 is formed between the bearing parts 3.1 and the connecting web 3.2.

The groove 6 has an essentially L-shaped design and includes a groove section 6.1 between the connecting web 3.2 and a respective first contact side 3.5 of the bearing parts 3.1, as well as a second groove section 6.2, which is formed between the first hinge pin sleeve 25 and a respective second contact side 3.6 of the bearing parts 3.1. The first and the second contact side 3.5, 3.6, for each bearing part 3.1, are oriented perpendicular to one another and merge into one another via a first round section 26.

The connecting web 3.2 extends perpendicularly to an additional contact side 3.7 of the hinge pin sleeve 25, wherein the additional contact side 3.7 is situated spaced parallel apart from the second contact sides 3.6 to thereby form the second groove section 6.2. The connecting web 3.2 merges into the second contact side 3.7 via a second round section 27. The radius of the first round section 26 is designed to be greater than the radius of the second round section 27.

Figure 15:
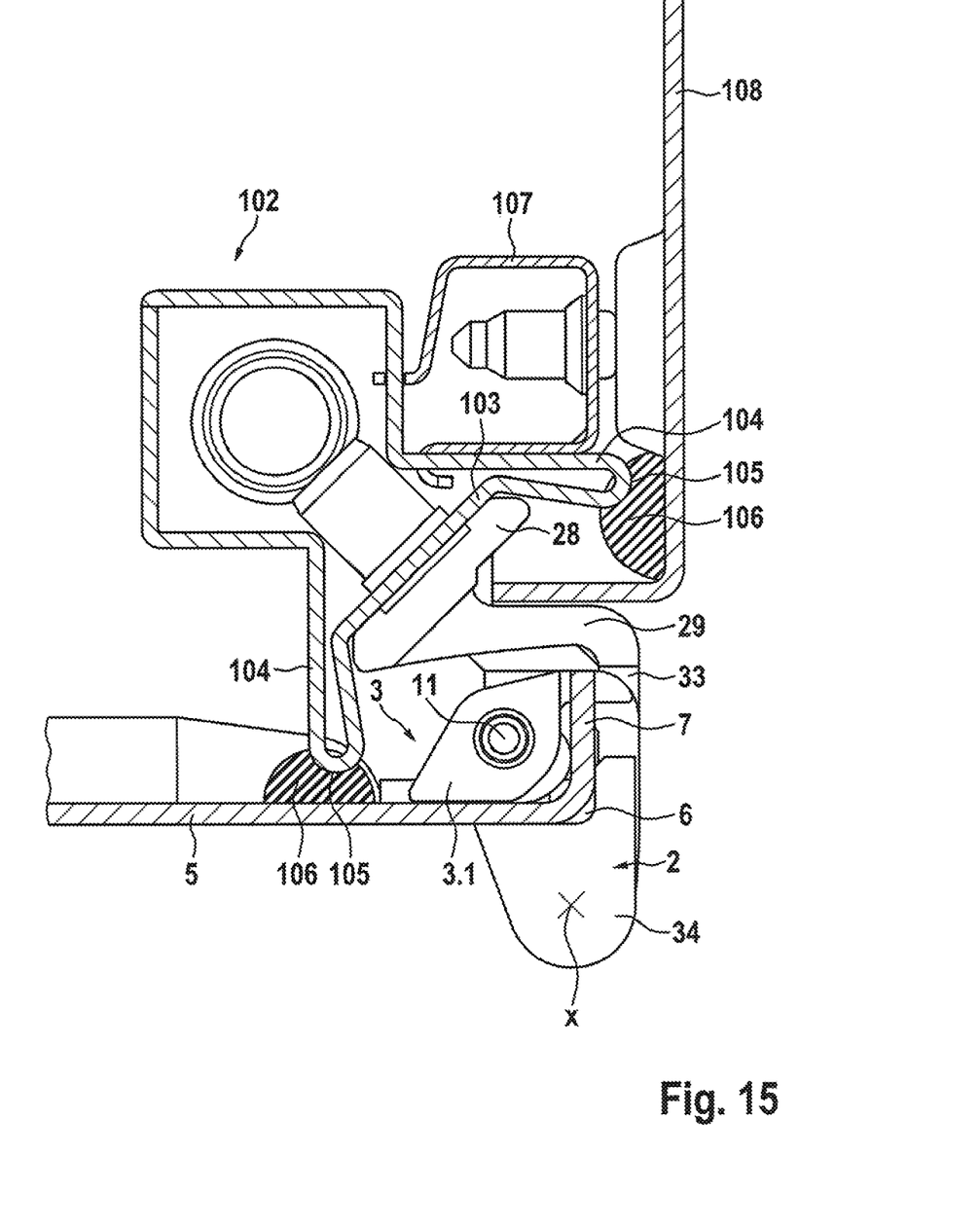
FIG. 15 shows another embodiment of a hinge arrangement in the closed position and in horizontal cross section.
Figure 16:
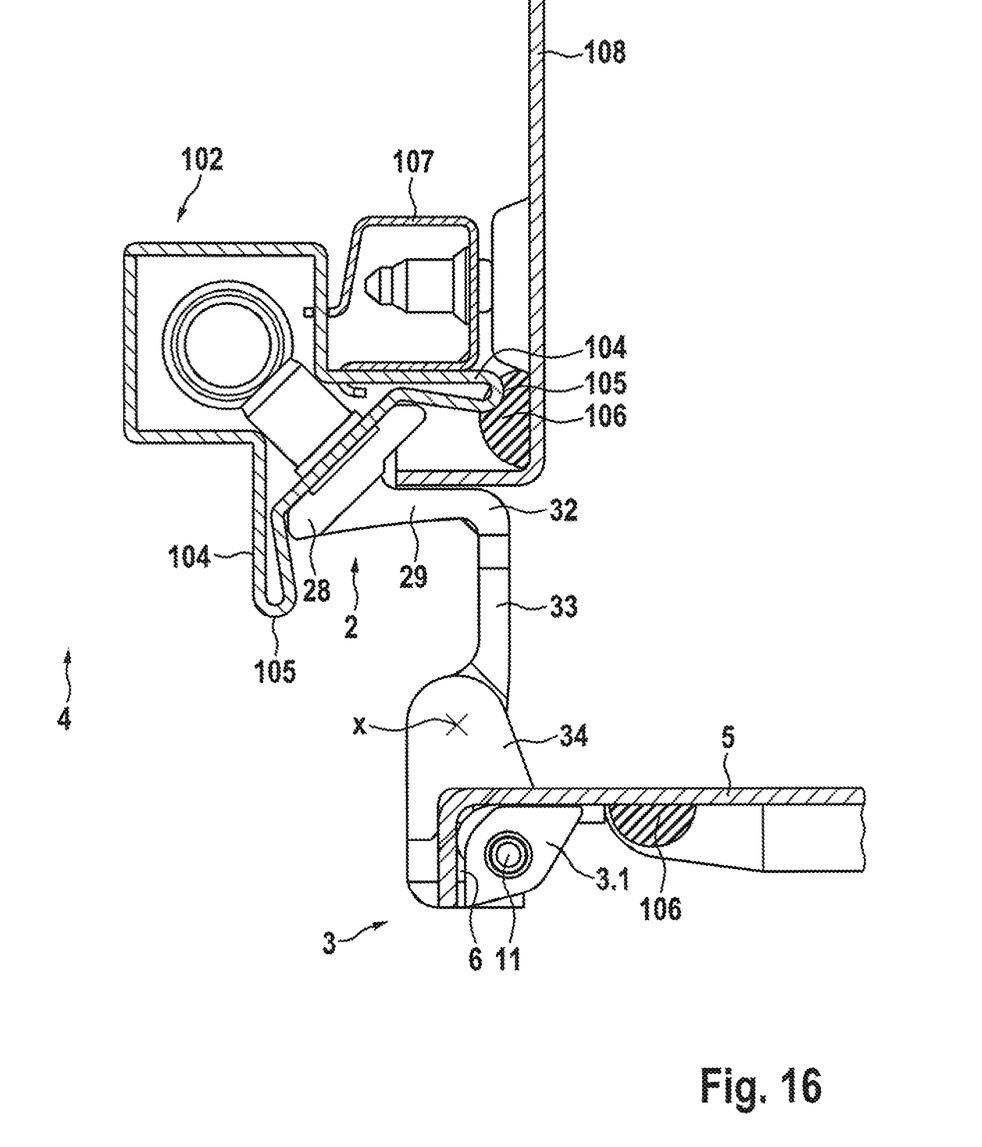
FIG. 16 shows the hinge arrangement according to FIG. 15 in the open position and again in horizontal cross section.

FIGS. 15 and 16 show an embodiment of the hinge arrangement according to the invention, one in the closed position (FIG. 15) and one in the open position (FIG. 16), wherein the door element 5 between the open position and the closed position is pivotable by 180° about the rotation axis x.

The arrangement according to FIGS. 15 and 16, in addition to the hinge formed from the hinge halves 2, 3, which is fixed to a vertical profile 102 of a framework of a switchgear cabinet, also includes a flat part 108, which is fixed to the same vertical profile 102 via a flat part holder 107. In the closed position of the door element 5, the flat part 108 is fixed in a plane offset by 90° relative to the plane of the door. Sealing planes are formed in the closed position by the free end of the sealing webs 104 designed as sealing edges 105, which correspondingly extend essentially perpendicularly to one another, via which sealing planes the flat part 108 on the one hand and the door element 5 on the other hand are sealed off from the vertical profile 102.

In FIG. 12 it is further apparent that in the open position depicted, the door element 5 is pivoted completely out of the clear dimension of the door opening 4. The first hinge half 2 in the closed position of the door element 5 extends between an outer edge of the projection 7 and a folded edge of the flat part 108, wherein the second hinge half in the closed position is fully accommodated in a receptacle formed between the sealing web 104 on the door side, the first profile web 29, the second profile web 33 extending perpendicularly to the first profile web 29 and the door element 5, so that in the closed position, the second hinge half 3 is completely covered and is therefore not visible from the outside or is protected from any mechanical stress.

The features of the invention disclosed in the preceding description, in the drawings and in the claims may be essential for the implementation of the invention, both alone as well as in arbitrary combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A hinge arrangement for a switchgear housing cabinet comprising, a first hinge half, which is fastened to a vertical side wall or to a vertical profile, delimiting a door opening, of a switchgear cabinet housing, and including a second hinge half, which is fastened to a door element, the hinge halves being connected to each other so as to be able to pivot relative to each other via a rotation axis, so that the door element closes the door opening when in a closed position and completely exposes the door opening when in an open position, and the rotation axis being outside an outer circumference of both the door opening and the door element, wherein the second hinge half includes a groove, via which the second hinge half is fitted onto a projection on the outer circumference of the door element, the projection being a 90° folded edge on the outer circumference of the door element, wherein the door element has an edged flat part which includes a door side that extends parallel to, and covers, the door opening when the door element is in the closed position, and which includes the circumferential 90° folded edge, and wherein the second hinge half is mounted with a first support surface directly abutting an interior surface of the door side and a second support surface on the 90° folded edge, with the first support surface directly abutting the interior side of the door serving to protect the mounting of the second hinge from forces directed to the door element.

2. The hinge arrangement according to claim 1, in which the projection extends parallel to the rotation axis and, at least when the door element closes the door opening, perpendicularly to the door opening.

3. The hinge arrangement according to claim 1, in which the projection includes a fastening means on its inner side facing away from the outer circumference and the second hinge half fitted completely onto the projection via the groove includes an additional fastening means operatively coupled to the fastening means, via which the second hinge half is fixed in position fitted completely onto the projection.

4. The hinge arrangement according to claim 3, in which the fastening means is a pin through-opening and the additional fastening means is an additional pin through-opening through the second hinge half, which is aligned with the pin through-opening, wherein the aligned pin through-openings are connected to one another via a connecting pin passed through them.

5. The hinge arrangement according to claim 1, in which the switchgear cabinet housing has a U-profile on the door opening having two parallel or essentially parallel profile sides, which are connected to an additional profile side extending perpendicularly relative to the two profile sides, wherein the U-profile is contoured to the vertical side wall via a first of the essentially parallel profile sides and an additional 90° folded edge, and wherein the second of the parallel profile sides is a sealing side, which is in abutment with a sealing element situated on an inner side of a door element, when the door element is in its closed position.

6. The hinge arrangement according to claim 5, in which the first hinge element extends between the two parallel profile sides and is fastened to the profile side contoured on the side wall.

7. The hinge arrangement according to claim 3, in which the second hinge half includes two bearing parts, each having a first through-hole for accommodating the rotation axis as part of the additional fastening means-, a second through-hole extending parallel to the first through-hole for accommodating a connecting pin and a partial groove extending continuously in the direction of the rotation axis also parallel to the second through-hole, wherein the two bearing parts are connected to one another via a connecting web at a distance to one another and wherein the two bearing parts are connected to both aligned first and second through-holes as well as to aligned partial grooves.

8. The hinge arrangement according to claim 7, in which the connecting web has a contact side, which aligns with one boundary side each of the two partial grooves, so that the contact side of the connecting web, together with the boundary sides of the partial grooves, form a groove boundary wall of the groove of the second hinge half, which is continuous in the direction of the rotation axis.

9. The hinge arrangement according to claim 8, in which the groove of the second hinge half is interrupted on its side opposite the continuous groove boundary wall in the area between the two bearing parts.

\* \* \* \* \*